Oct. 30, 1951 — C. A. RIDER — 2,572,950
CONTROL VALVE
Filed July 11, 1947 — 2 SHEETS—SHEET 1
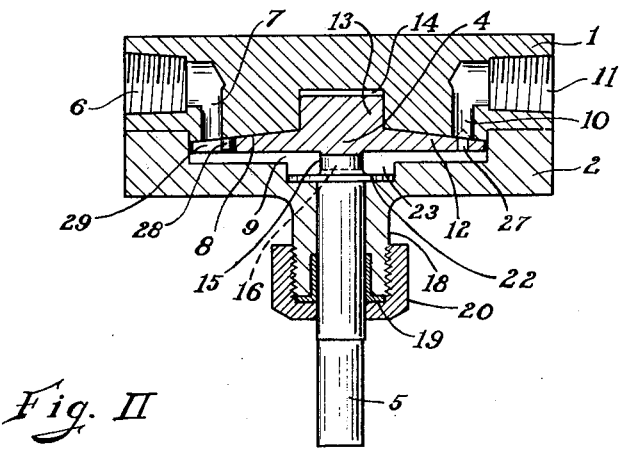
Fig. II
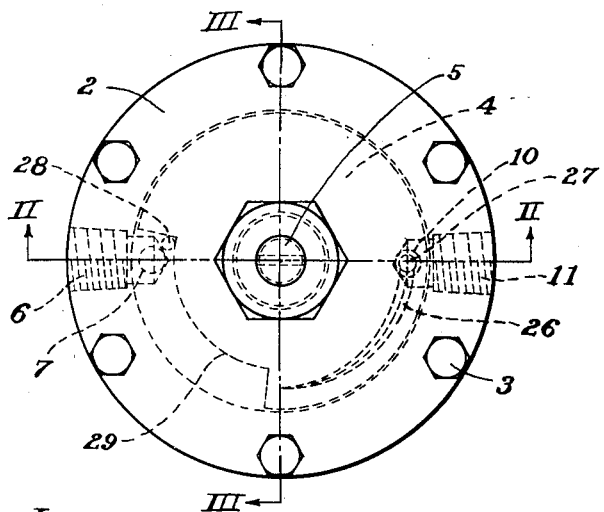
Fig. I
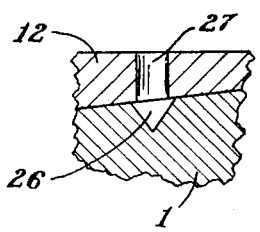
Fig. V
INVENTOR.
Clarence A. Rider
BY William B. Wharton
his attorney Oct. 30, 1951 — C. A. RIDER — 2,572,950
CONTROL VALVE
Filed July 11, 1947 — 2 SHEETS—SHEET 2
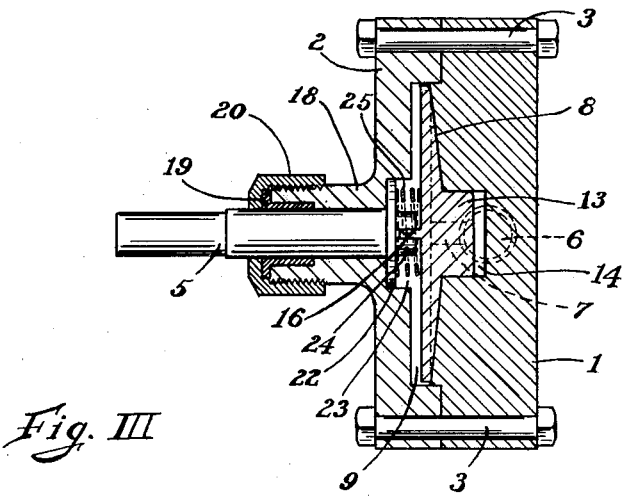
Fig. III
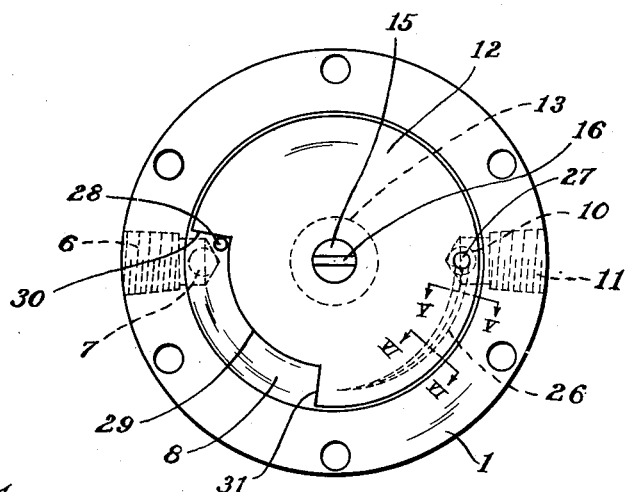
Fig. IV
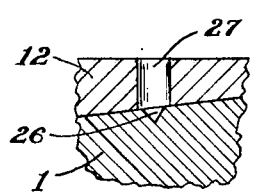
Fig. VI
INVENTOR.
*Clarence A. Rider*
BY *William B. Wharton*
his attorney Patented Oct. 30, 1951

2,572,950

UNITED STATES PATENT OFFICE 2,572,950

CONTROL VALVE

Clarence A. Rider, Houston, Pa., assignor to Steel Processing Company, Pittsburgh, Pa., a corporation of Pennsylvania Application July 11, 1947, Serial No. 760,301

1 Claim. (Cl. 251—84)

This invention relates to a valve for controlling the flow of fluids, and more particularly to a valve for controlling the flow of fluid fuels, such as oils in passage to a burner.

One object of the invention is to provide means simple in construction and positive in operation for accurately controlling the flow of oil or other fluid fuel to a burner.

Another object of the invention is to provide a controlling valve for oil or other fluid fuel which gives a finely apportioned regulation in the oil delivered by way of the valve with a minimum of valve movement, thus particularly adapting the valve to use in automatic control organizations.

A further object of the invention is to provide within the valve structure a fluid passage so arranged that gumming and clogging tendencies are reduced to a minimum.

A still further object of the invention is to provide a valve having the several noted advantages in regulating the flow of fluids which is capable of performing its function on both liquid and aeroform fluids generally considered, advantageously to control the flow of such fluids for various purposes and in various associations.

In the accompanying drawings illustrative of one embodiment of my invention:

Fig. I is a top plan view of the valve assembly.

Fig. II is an inverted vertical sectional view taken in the plane of the section line II—II of Fig. I.

Fig. III is an angularly positioned vertical sectional view taken in the plane of section line III—III of Fig. I.

Fig. IV is a top plan view of the valve body and the rotor of the valve after removing the chambered cover element of the valve and the structure associated with it.

Fig. V is a fragmentary cross-sectional view of an enlarged scale, taken through the regulating groove in the valve seat in the plane of the section line V—V of Fig. IV.

Fig. VI is a similar view taken in the plane of the section line VI—VI of Fig. IV.

In its primary elements the valve as shown comprises a valve base or body 1, a chambered cover element 2 secured to the valve base or body as by bolts 3, a valve rotor 4 confined between valve body and the cover element of the valve and a valve stem 5 for causing rotational movement of valve rotor 4. In valve body 1 there is a socket 6 for the attachment of a fluid-supply duct and an inlet duct 7 leading from socket 6 through the face, or valve seat, 8 formed in the upper surface of body 1 to chamber 9 in cover element 2. A delivery duct 10 leads from the valve seat to a socket 11 for the attachment of a fluid delivery fitting.

Valve rotor 4 comprises primarily disc 12, a seating stem 13 extended downwardly from disc 12 and arranged rotatably to lie in a countersunk seating depression 14 in the valve body and an abbreviated upwardly extended stem 15 terminating in a key 16. Valve stem 5 extends downwardly through an upwardly projected tubular portion 18 of cover element 2 and is sealed against the escape of fluid by gland 19 and gland nut 20. A collar 22 or valve stem 5 lies within an extension 23 of chamber 9 in the cover element and a terminally slotted extension 24 of the valve stem is projected downwardly from collar 22 into engagement with key 16 on the rotor. A bias spring 25 is interposed between collar 22 on the valve stem and the upper face of valve rotor 4. Rotation of valve stem 5 thus causes rotation of valve rotor 4 with respect to valve seat 8 of body 1. It is to be understood that the surfaces of valve seat 8 and rotor 4 are held in contact by spring 25 and that these contacting surfaces are smoothly finished.

Oil or other fluid enters the valve body from a supply line and passes upwardly through duct 7 into chamber 9 lying between the upper surface of rotor 4 and the opposed inner wall of cover element 2. After passing from chamber 9 through suitable passages, which will be described, the fluid is delivered by way of delivery duct 10 to a delivery line. Supply duct 7 and delivery duct 10 are spaced apart substantially in the valve body, and desirably have the approximately diametrically opposed relation shown in the drawings. The volume of fluid, such as oil, which is delivered by way of the valve is accurately regulated by the control of such delivery passages in adjusted angular position of rotor 4 with respect to seat 8 of valve body 1.

The regulatory passages for flow of fluid from chamber 9 to delivery duct 10 comprise an arcuate channel 26 grooved in the valve seat and terminating at one of its ends in delivery duct 10. This channel 26 extends through less than the distance between delivery duct 10 and supply duct 7 in body 1 of the valve, and has an unconnected terminal, or dead end, in the valve body. With this channel 26 of the valve seat there cooperates a port 27 through disc 12 of rotor 4, which serves to place chamber 9 either in communication with channel 26 or directly in communication with delivery duct 10.

As shown, regulating channel 26 extends through an arc of approximately 90° from the center of the opening of delivery duct 10 through the valve seat and decreases progressively from the delivery duct to the end of the channel in valve body 1. As will be noted by a comparison of Figs. V and VI of the drawings, both the depth and lateral dimensions of the groove decrease correspondingly from the delivery end to the dead end of the groove, so that the shape of the groove is symmetrical throughout its length. This fact is of importance in determining the cross sectional dimensions and length of the groove, to give a desirable fluid delivery curve and to eliminate irregular change in frictional resistance to the passage of oil through different sections of the channel beneath the under face of rotor disc 12.

In accordance with the structure as thus described, valve rotor 4 is rotated by rotating valve stem 5 to bring port 27 through rotor disc 12 directly into register with delivery duct 10 for large volume delivery of fluid through the valve, or to bring it selectively into register with channel 26 at any point along the length of the channel 26 to provide delivery of fluid through the valve in accordance with the dimensions of the channel at the point at which duct 27 through the rotor disc registers therewith.

Means are provided for limiting rotational movement of valve rotor 4 between its fully open position in which part 27 through the rotor is wholly in register with the opening of delivery port 10 and fully closed position in which port 27 through the rotor passes beyond the blanket terminal of channel 26 in valve body 1. Such means comprise a stop pin 28 standing from the face of seat 8 adjacent the opening of supply duct 7 therethrough. Stop pin 28 stands within the ambit of rotor 4 and within a peripherally deleted region 29 of the rotor terminating in shoulders 30 and 31 adapted to come into abutment with the stop pin to prevent additional rotational movement of the rotor.

In the position illustrated as existing in Fig. IV of the drawings, rotor 4 has been moved to its extreme open position with port 27 through disc 12 of the rotor fully overlying the opening of delivery port 10 through valve seat 8. Further movement of the rotor in the same direction of rotation beyond fully opened position is prevented by abutment or shoulder 30 with stop pin 28. The rotor 4 being reversely rotated progressively to decrease valve opening port 27 through rotor disc 12, may be brought into such successive positions that it communicates with outlet port 10 only by way of progressively decreased cross-sectional areas of channel 26, until port 27 through the rotor disc is blanked by passing beyond the limits of channel 26 and further movement in that valve-closing direction of rotation is prevented by abutment of shoulder 31 with stop pin 28.

Figs. V and VI of the drawings assume positions of rotor 4 to bring port 27 through its disc into register with different regions of the delivery groove. Thus, in Fig. V the rotor is assumed to have been rotated to a point bringing port 27 into register with groove 26 in a position lying in the plane of the section line V—V of Fig. IV. In that position it will be noted that the cross-sectional area of the delivery channel is relatively great and that a stream of relatively great volume is thus permitted to flow through it to the delivery port. In Fig. VI of the drawings rotor 4 is assumed to have been further rotated in the same direction to bring port 27 into register with a region of groove 26 which is of lesser cross-sectional area and thus to restrict the volume of fluid passing to delivery by way of the channel. Further movement of the rotor in the same direction of rotation obviously carries port 27 beyond the limits of groove 26 fully to close the valve. It will be noted that in both Fig. V and Fig. VI groove 26 has the same cross-sectional contour, the difference being wholly one in the cross-sectional dimensions of the groove.

It may be explained that with a grooved channel so formed progressive valve opening is not proportional to give a straight-line graph when plotted. On the contrary the graph for fluid delivery between fully closed and fully open valve positions is a curve the form of which is determined by the angle formed by the sides of the delivery channel in the valve seat.

It has been noted that the more restricted end of delivery groove 26 finds its terminal short of the supply port through the valve seat, so that a position of rotor port 27 beyond that terminal of the groove gives a definite closed condition of the valve. It also has been noted that delivery groove or channel 26 desirably is relatively short. This arrangement gives a restricted rotational movement to the rotor of the valve in moving between fully opened position or fully closed position. In automatic regulating systems in which the valve of this invention finds its greatest utility, effective regulation by means of strictly limited valve movement is highly desirable because of the delicacy of adjustments in the regulating mechanism of which the valve forms a part. Also it has been found that the arrangement by which a through port in the disc of the valve rotor registers with a fixed channel in the valve seat leading to a delivery port in the valve seat gives a nicer regulation than if a channel in the valve rotor is used to place two through ports in the valve seat in communication with each other. The arrangement of fluid passages in this valve is well adapted to simplification in cleaning the valve in intervals of its active use. Thus the valve is readily cleaned by running steam through the valve passages either in the direction of fluid fuel therethrough or in the reverse direction, the valve rotor desirably being rotated during the cleaning operation.

The positive stop associated with the rotor defines the fully open position of the valve structure so that opening movement cannot be carried to a point at which the valve is inadvertently wholly or partially closed; and the closing movement of the valve rotor cannot carry the rotor to a point from which excessive movement is required again to permit delivery of fluid through the valve. It may be noted that the stop positively limiting valve movement acts directly upon the movable regulating element of the valve and that it is enclosed within the structure of the body and cover elements of the valve assembly. As shown, the opening of supply duct 7 through valve seat 8 is within the marginally deleted region 29 of rotor 4, so that when port 27 through the rotor disc is blanked supply duct 7 also is blanked. It is, however, quite possible to restrict the diameter of rotor 4 so that the opening of duct 7 lies wholly outside the ambit of the rotor and chamber 9 is continuously in communication with the fluid supply.

One directly indicated use of the valve of my invention is in controlling the flow of oil to a burner utilizing it as fuel. The valve has, however, utility in controlling the delivery rate of liquid or aeroform fluids generally. For example, it can be used to advantage in controlling the flow of combustible gas, or combustion supporting gas, to a burner, for controlling the flow of liquids and gases in water treatments and in controlling the delivery of liquid and gaseous fluid reagents in conducting chemical processes. Uses of the above sort are specifically mentioned because they are of the sort which are particularly susceptible of automatic regulation and the valve as disclosed herein is particularly well-adapted to inclusion in automatic regulating apparatus. It should be understood, however, that the valve has high utility simply to control the flow of fluids for any purpose in which nice regulation in the delivery rate is desirable.

I claim as my invention:

A valve comprising a valve body, a valve seat on said valve body, a cover structure enclosing a chamber above said valve seat, a supply duct and a delivery duct communicating with said chamber at points spaced apart in the said valve seat, a delivery groove in said valve seat extended arcuately from the opening of the said delivery duct through the valve seat to a terminal spaced from the opening of the said supply duct through the valve seat, both the depth and lateral dimensions of said groove decreasing progressively and correspondingly from the said delivery duct opening to said terminal whereby said groove is of approximately uniform cross-sectional contour throughout its length, a rotor in said chamber separating said delivery duct and the delivery groove leading thereto from the said fluid chamber and rotatable in said valve body concentrically with the said delivery groove in the valve seat and to be moved to a position with respect to the valve seat beyond the said groove completely to close the valve, and a through port in said rotor positioned therein to match with said groove in regulatory rotation of said rotor to provide a channel of selected minimum cross-sectional area between said chamber and said delivery duct.

CLARENCE A. RIDER.

REFERENCES CITED

The following references are of record in the file of this patent:

UNITED STATES PATENTS

| Number | Name | Date |
|---|---|---|
| 644,741 | Guthrie | Mar. 6, 1900 |
| 902,264 | Stevens | Oct. 27, 1908 |
| 1,527,927 | Schroder | Feb. 24, 1925 |
| 1,786,330 | Berkeley | Dec. 23, 1930 |
| 2,061,716 | Pratt | Nov. 24, 1936 |
| 2,351,732 | Almond | June 20, 1944 |